(12) United States Patent
Chen et al.

(10) Patent No.: US 12,705,201 B2
(45) Date of Patent: Aug. 11, 2026

(54) PCIE NETWORK CARD AND INTERFACE MODE SWITCHING METHOD THEREFOR, ELECTRONIC DEVICE, AND STORAGE MEDIUM

(71) Applicant: SUZHOU METABRAIN INTELLIGENT TECHNOLOGY CO., LTD., Suzhou (CN)

(72) Inventors: Sanxia Chen, Suzhou (CN); Tiejun Liu, Suzhou (CN); Dan Liu, Suzhou (CN); Peiqiang Dong, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 18 days.

(21) Appl. No.: 18/874,576

(22) PCT Filed: Sep. 26, 2023

(86) PCT No.: PCT/CN2023/121768
§ 371 (c)(1),
(2) Date: Dec. 12, 2024

(87) PCT Pub. No.: WO2024/148860
PCT Pub. Date: Jul. 18, 2024

(65) Prior Publication Data

US 2025/0165427 A1 May 22, 2025

(30) Foreign Application Priority Data

Jan. 10, 2023 (CN) ........................ 202310034883.7

(51) Int. Cl.
*G06F 13/42* (2006.01)
*G06F 13/38* (2006.01)
(Continued)

(52) U.S. Cl.
CPC ....... *G06F 13/4221* (2013.01); *H04B 10/278* (2013.01); *G06F 2213/0026* (2013.01)

(58) Field of Classification Search
CPC ............................ G06F 11/2033; G06F 30/34
See application file for complete search history.

(56) References Cited

U.S. PATENT DOCUMENTS 9,363,691 B1 * 6/2016 Shipley ................. H04W 24/04
12,045,190 B2 * 7/2024 Yoshida ............. G06F 13/4221
(Continued)

FOREIGN PATENT DOCUMENTS

CN 201945991 U 8/2011
CN 102694603 A 9/2012
(Continued)

*Primary Examiner* — Getente A Yimer
(74) *Attorney, Agent, or Firm* — IPro, PLLC

(57) ABSTRACT

A PCIE network card and a method for switching an interface mode thereof, an electronic device, and a storage medium are provided in some embodiments of the present application. The PCIE network card includes an Ethernet optical port and a main processor, and the Ethernet optical port is connected to the main processor, wherein the Ethernet optical port is configured to support a plurality of interface modes, and the interface modes include a PCIE interface mode. The main processor is configured to switch the interface mode of the Ethernet optical port. By using the above-mentioned structure, the Ethernet optical port on the PCIE network card may be enabled to be used as storage interface expansion, and the main processor may be used to realize the free switching of different interface modes.

17 Claims, 3 Drawing Sheets

(51) Int. Cl.
*G06F 13/40* (2006.01)
*H04B 10/278* (2013.01)

(56) References Cited

U.S. PATENT DOCUMENTS

| | | | | |
|---|---|---|---|---|
| 2007/0101215 | A1* | 5/2007 | Holmqvist | G01R 31/2834 714/724 |
| 2016/0299561 | A1* | 10/2016 | Middleton | G06F 13/4045 |
| 2017/0147456 | A1* | 5/2017 | Lee | G06F 11/2033 |
| 2019/0213295 | A1* | 7/2019 | Leong | G06F 30/34 |
| 2020/0278733 | A1 | 9/2020 | Li et al. | |
| 2020/0371984 | A1* | 11/2020 | Patil | G06F 13/4068 |
| 2021/0334226 | A1 | 10/2021 | Yeung et al. | |
| 2022/0292026 | A1* | 9/2022 | Hornung | G06F 12/1072 |

FOREIGN PATENT DOCUMENTS

| | | | |
|---|---|---|---|
| CN | 202798752 | U | 3/2013 |
| CN | 108880674 | A | 11/2018 |
| CN | 109376105 | A | 2/2019 |
| CN | 110808908 | A | 2/2020 |
| CN | 210776647 | U | 6/2020 |
| CN | 111538689 | A | 8/2020 |
| CN | 111752871 | A | 10/2020 |
| CN | 112436948 | A | 3/2021 |
| CN | 215835409 | U | 2/2022 |
| CN | 114780472 | A | 7/2022 |
| CN | 115733549 | A | 3/2023 |
| WO | 2023273140 | A1 | 1/2023 |

* cited by examiner

PCIE NETWORK CARD AND INTERFACE MODE SWITCHING METHOD THEREFOR, ELECTRONIC DEVICE, AND STORAGE MEDIUM

CROSS-REFERENCE TO RELATED APPLICATION

This application claims the priority of the Chinese Patent application filed on Jan. 10, 2023 before the China National Intellectual Property Administration with the application number of 202310034883.7, and the title of "PCIE NETWORK CARD AND INTERFACE MODE SWITCHING METHOD THEREFOR, ELECTRONIC DEVICE, AND STORAGE MEDIUM", which is incorporated herein in its entirety by reference.

FIELD

Some embodiments of the present application relate to the technical field of Internet and, more particularly, to a peripheral component interconnect express (PCIE) network card and a method for switching an interface mode thereof, an electronic device, and a non-transitory readable storage medium.

BACKGROUND

With the rapid development of big data and cloud computing, the demand for technologies such as image processing and accelerated computing has been increasing. In recent years, the use of PCIE cards has become more widespread. It has become a trend to insert the PCIE card into a server motherboard in the form of a PCIE interface to achieve function applications. The advantage is that the PCIE card may be directly inserted into a PCIE slot of a desktop or server through a PCIE gold finger for debugging and usage, which is simple, flexible and cost-effective for development. However, the PCIE interface of the server adopts high-speed serial point-to-point dual-channel high-bandwidth transmission, the devices connected to the PCIE interface of the server are allocated exclusive channel bandwidth and do not share the bus bandwidth. It mainly supports functions, such as active power management, error reporting, end-to-end reliable transmission, hot-plugging, and quality of service (QOS).

In the rapidly changing era of big data networks, sometimes a host needs to perform more network interactions. Therefore, the PCIE network cards need to be added, and the network bandwidth needs to be increased. After increasing the network bandwidth, more data storage space will also be involved. However, the network bandwidth and the data storage are not in an equal relationship. It is possible that the network data may needs to be stored in a certain stage, which requires a very large storage space, thus the addition of PCIE storage expansion cards is needed. However, the validity period of the stored data is very short, and the storage space may be released after a period of time, meaning that a large storage space is not needed. Thus, there is a situation where sometimes the storage application takes precedence, and sometimes the network bandwidth demand takes precedence. The quantity of PCIE slots of a personal computer (PC) host is limited, and equipping numerous and various PCIE expansion cards also increases more cost at the same time. If the demand still cannot be met, the quantity of hosts needs to be increased, the cost of hardware may also be increased.

SUMMARY

A PCIE network card and a method for switching an interface mode thereof, an electronic device, and a non-transitory readable storage medium are provided by some embodiments of the present application to solve or partially solve the problems that the number of PCIE slots of a host is limited, equipping a plurality of storage expansion cards may increase the cost of the hardware, and the PCIE network card cannot be used as a storage expansion card.

A PCIE network car is provided by some embodiments of the present application, the PCIE network car includes an Ethernet optical port and a main processor, and the Ethernet optical port is connected to the main processor;

wherein the Ethernet optical port is configured to support a plurality of interface modes, and the interface modes include a PCIE interface mode;

the main processor is configured to switch an interface mode of the Ethernet optical port; in response to the interface mode of the Ethernet optical port being switched to the PCIE interface mode, the PCIE network card is connected to a PCIE slot of a host as a storage expansion card.

In some embodiments, the Ethernet optical port is connected to the main processor through a hardware link.

In some embodiments, the hardware link is that the Ethernet optical port is connected to a pin of the main processor through an optical port high-speed data line and a PCIE high-speed data line; and the Ethernet optical port is connected to an optical module.

In some embodiments, the optical module transmits a first differential signal to the main processor through the optical port high-speed data line connected to the Ethernet optical port to realize data interaction between the main processor and the optical module; and the main processor transmits a second differential signal to the Ethernet optical port through the PCIE high-speed data line to realize data interaction between the main processor and the optical module.

In some embodiments, the optical module is provided with a memory, and the memory is configured to store a module type for the optical module; the PCIE network card includes a level conversion chip, and the level conversion chip is configured to convert a high-level signal in the Ethernet optical port into a low-level signal compatible with the main processor.

In some embodiments, after the level conversion chip converts the high-level signal in the Ethernet optical port into the low-level signal compatible with the main processor, the main processor reads the module type stored in the optical module and selects the interface mode of the Ethernet optical port according to the module type of the optical module.

In some embodiments, the optical module is configured to perform signal conversion between an electrical signal and an optical signal; the interface modes of the Ethernet optical port further include an optical port mode, and the module type includes an optical module type and a non-optical module type;

in response to the module type being the optical module type, the interface mode of the Ethernet optical port is the optical port mode; and in response to the module type being the non-optical module type, the main processor switches the optical port mode to the PCIE interface mode.

In some embodiments, the PCIE network card includes a clock module, the clock module is configured to output a reference clock signal;

in response to the interface mode of the Ethernet optical port being an optical port mode, a level control signal outputted by the main processor is a high-level signal, and the clock module prohibits outputting the reference clock signal; and in response to the interface mode of the Ethernet optical port being the PCIE interface mode, the level control signal outputted by the main processor is a low-level signal, wherein the clock module outputs the reference clock signal; the Ethernet optical port is used as a PCIE external interface according to the low-level signal and the reference clock signal, and the PCIE external interface is configured to externally connect to a solid state drive.

In some embodiments, an optical module is powered by a three-way power supply, and in response to the PCIE external interface being externally connected to the solid state drive, the solid state drive reuses the power supply for powering the solid state drive.

In some embodiments, an optical module is connected to the host; the main processor includes a ModSeL signal, and an output pin corresponding to the ModSeL signal on the main processor is connected to an input pin corresponding to the ModSeL signal on the Ethernet optical port, wherein the ModSeL signal is a control signal outputted by the host to the optical module.

In some embodiments, an optical module is connected to the host; the main processor includes a Reset signal, and an output pin corresponding to the Reset signal on the main processor is connected to an input pin corresponding to the Reset signal on the Ethernet optical port, wherein the Reset signal is a reset signal sent by the host to the optical module.

In some embodiments, an optical module is connected to the host; the main processor includes an SCL signal, and an output pin corresponding to the SCL signal on the main processor is connected to an input pin corresponding to the SCL signal on the Ethernet optical port, wherein the SCL signal is used for reading an optical module state of the optical module to determine a module type of the optical module.

In some embodiments, an optical module is connected to the host; the main processor includes an SDA signal, and an output pin corresponding to the SDA signal on the main processor is connected to an input pin corresponding to the SDA signal on the Ethernet optical port, wherein the SDA signal is used for reading an optical module state of the optical module to determine a module type of the optical module.

In some embodiments, an optical module is connected to the host; the main processor includes an LPMode signal, and an output pin corresponding to the LPMode signal on the main processor is connected to an input pin corresponding to the LPMode signal on the Ethernet optical port, wherein the LPMode signal is used for controlling whether a working mode of the optical module enters a low power consumption mode.

In some embodiments, an optical module is connected to the host; the optical module is connected to the Ethernet optical port, and the optical module sends a ModPrs signal to the Ethernet optical port; an input pin corresponding to the ModPrs signal on the main processor is connected to an output pin corresponding to the ModPrs signal on the Ethernet optical port, wherein the ModPrs signal is used for reading whether the optical module is present.

In some embodiments, an optical module is connected to the host; the optical module is connected to the Ethernet optical port, and the optical module sends an INTC signal to the Ethernet optical port; an input pin corresponding to the INTC signal on the main processor is connected to an output pin corresponding to the INTC signal on the Ethernet optical port, wherein the INTC signal is used for determining whether a signal outputted by the optical module to the host is interrupted, and sending interruption information to the host.

A method for switching an interface mode of a PCIE network card is provided by some embodiments of the present application, applied to a PCIE network card, wherein the PCIE network card includes an Ethernet optical port and a main processor, and the Ethernet optical port is connected to the main processor; the Ethernet optical port is configured to support a plurality of interface modes, and the interface modes include a PCIE interface mode; the method includes:

switching the interface mode of the Ethernet optical port through the main processor, wherein in response to the interface mode of the Ethernet optical port being switched to the PCIE interface mode, the PCIE network card is connected to a PCIE slot of a host as a storage expansion card.

In some embodiment, the method further includes:

in response to the interface mode of the Ethernet optical port being an optical port mode, a level control signal outputted by the main processor being a high-level signal, and prohibiting, by a clock module, outputting a reference clock signal, wherein a level conversion chip converts the high-level signal in the Ethernet optical port into a low-level signal compatible with the main processor; and in response to a module type of an optical module read by the main processor being a non-optical module type, switching the optical port mode to the PCIE interface mode, wherein the level control signal outputted by the main processor is a low-level signal, and the clock module outputs the reference clock signal; the reference clock signal is used for using the Ethernet optical port as a PCIE external interface, and the PCIE external interface is configured to externally connect to a solid state drive.

An electronic device is provided by some embodiments of the present application, including a processor, a communication interface, a memory and a communication bus, wherein the processor, the communication interface and the memory are communicated with each other through the communication bus;

the memory is configured to store a computer program; and the processor is configured to, in response to executing the program stored on the memory, implement the method in some embodiments of the present application.

A non-transitory readable storage medium storing instructions is provided by some embodiments of the present application, which, in response to being executed by one or more processors, cause the one or more processors to perform the method in some embodiments of the present application.

Some embodiments of the present application include the following advantages.

In some embodiments of the present application, a PCIE network card is provided, which includes an Ethernet optical port and a main processor. The Ethernet optical port is connected to the main processor. The Ethernet optical port may be configured to support a plurality of interface modes, and the default mode is the optical port mode. In some embodiments of the present application, the Ethernet optical port may also support the PCIE interface mode, i.e., the Ethernet optical port may not only be compatible with the optical port mode but also be compatible with the PCIE interface mode. In addition, the interface mode of the Ethernet optical port may be switched through the main processor. When the interface mode of the Ethernet optical port is switched to the PCIE interface mode, the PCIE network card may be connected to the PCIE slot of the host as the storage expansion card so that the Ethernet optical port on the PCIE network card may be used as a network port expansion and a storage interface expansion. Thus, the main processor may realize the free switching of the interface modes in different application scenarios, thereby resource waste caused by frequent replacement of the PCIE network card is avoided and the cost of hardware is saved.

DETAILED DESCRIPTION

Figure 1:
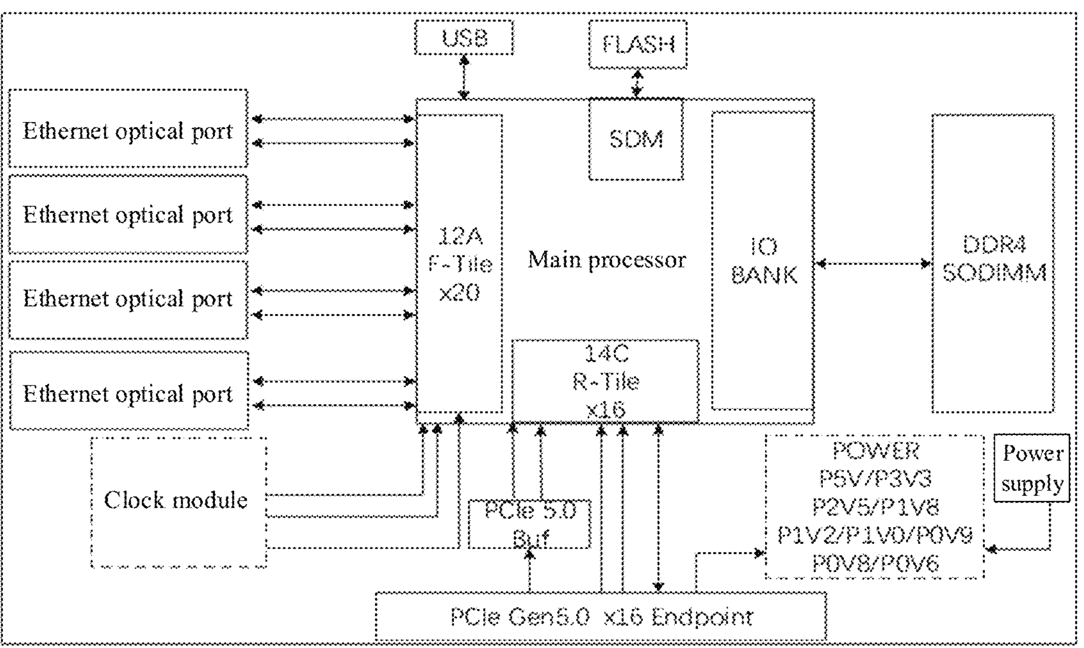
FIG. 1 is a first schematic structural diagram of a PCIE network card according to some embodiments of the present application.

In order to make the above-mentioned objects, features, and advantages of the present application more obviously and easily to understand, the present application is further described in detail below with reference to the drawings and implementations.

In order to enable a person skilled in the art to better understand the technical solutions of some embodiments of the present application, some technical features involved in some embodiments of the present application are explained and described below.

PCIE, also referred to as PCI-Express, belongs to high-speed serial point-to-point dual-channel high-bandwidth transmission, the devices connected to the PCI-Express are allocated exclusive channel bandwidth and do not share the bus bandwidth. The PCI-Express mainly supports functions, such as active power management, error reporting, end-to-end reliable transmission, hot-plugging, and QOS.

Field-programmable gate array (FPGA) is a product of further development on the basis of programmable devices such as phase alteration line (PAL), generic array logic (GAL), and complex programmable logic device (CPLD) and may be used as a semi-custom circuit in the field of application-specific integrated circuits (ASICs), which not only solves the deficiency of the custom circuits but also overcomes the shortcomings of the limited number of gate circuits of the original programmable device.

Double data rate synchronous dynamic random-access memory (DDR SDRAM), compared with the traditional single data rate, achieves two read/write operations within one clock cycle, i.e., one read/write operation on the rising edge and the other read/write operation on the falling edge of the clock.

Personal computer (PC) may include a hardware system and a software system, and is a device that may run independently to perform special functions.

Solid state drives (SSD) is a hard disk made of a solid-state electronic memory chip array and includes a control unit and a storage unit. The SSD is identical to the traditional hard disk in the specification and definition of interface, function, use method, product shape, and size, but the input/output (I/O) performance is greatly improved compared with the traditional hard disk. It is widely used in military, vehicle, industrial control, video monitoring, network monitoring, network terminal, power, medical, aviation, navigation devices, and other fields.

Central processing unit/processor (CPU) is one of the main devices of an electronic computer and is the core accessory in the computer. Its main function is to interpret computer instructions and process data in computer software. All operations in the computer are handled by the CPU, which is the core component responsible for reading, decoding, and executing instructions.

Serial advanced technology attachment (SATA) is a computer bus that is responsible for data transmission between a motherboard and a mass storage device (such as a hard disk and an optical disk drive) and mainly used in the PC.

Non-transitory memory express (NVMe) may be an open collection of standards and information to fully demonstrate the advantages of a non-transitory storage in all types of computing environments from mobile devices to data centers. The NVMe is designed from the ground up to provide high-bandwidth and low-latency storage accesses for current and future NVMe technologies.

In some embodiments, in the rapidly changing era of big data networks, sometimes a host needs to perform more network interactions. Therefore, the PCIE network cards need to be added, and the network bandwidth needs to be increased. After increasing the network bandwidth, more data storage space will also be involved. However, the network bandwidth and the data storage are not in an equal relationship. It is possible that the network data may needs to be stored in a certain stage, which requires a very large storage space, thus the addition of PCIE storage expansion cards is needed. However, the validity period of the stored data is very short, and the storage space may be released after a period of time, meaning that a large storage space is not needed. Thus, there is a situation where sometimes the storage application takes precedence, and sometimes the network bandwidth demand takes precedence. The quantity of PCIE slots of a PC host is limited, and equipping numerous and various PCIE expansion cards also increases more cost at the same time. If the demand still cannot be met, the quantity of hosts needs to be increased, the cost of the hardware may also be increased.

In this regard, one of the core inventive points of the present application is to provide a PCIE network card, which includes an Ethernet optical port and a main processor. The Ethernet optical port is connected to the main processor. The Ethernet optical port may be configured to support a plurality of interface modes, and the default mode is the optical port mode. In some embodiments of the present application, the Ethernet optical port may also support the PCIE interface mode, i.e., the Ethernet optical port may not only be compatible with the optical port mode but also be compatible with the PCIE interface mode. In addition, the interface mode of the Ethernet optical port may be switched through the main processor. When the interface mode of the Ethernet optical port is switched to the PCIE interface mode, the PCIE network card may be connected to the PCIE slot of the host as the storage expansion card so that the Ethernet optical port on the PCIE network card may be used as a network port expansion and a storage interface expansion. Thus, the main processor may realize the free switching of the interface modes in different application scenarios, thereby resource waste caused by frequent replacement of the PCIE network card is avoided and the cost of hardware is saved.

Referring to FIG. 1, it is a first schematic structural diagram of a PCIE network card provided in some embodiments of the present application. It may be seen from the figure that the PCIE network card includes an Ethernet optical port and a main processor, and the Ethernet optical port is connected to the main processor.

The Ethernet optical port is configured to support a plurality of interface modes, and the interface modes include a PCIE interface mode.

The main processor is configured to switch the interface mode of the Ethernet optical port. When the interface mode of the Ethernet optical port is switched to the PCIE interface mode, the PCIE network card is connected to a PCIE slot of a host as a storage expansion card.

For the PCIE network card, it is a network adapter with a PCIE interface, which is used as an expansion card interface in a motherboard-level connection. A PCIE-based expansion card design is usually installed in a PCIE-based slot in motherboards of devices such as a host, a server, and a network switch. Most motherboards have a PCIE slot, which is usually only configured to install the PCIE network card in the corresponding PCIE slot. In some embodiments of the present application, basic modules on the PCIE network card may include a main processor, a clock module (circuit), a power supply circuit, an onboard storage circuit, and an interface circuit, and the interface circuit may include a power supply interface, a memory interface, a PCIE interface, an Ethernet optical port, and a universal serial bus (USB) debugging interface.

It should be noted that in some embodiments of the present application, the design primarily focuses on the compatibility of the Ethernet optical port on the PCIE network card, and the main processor is used to freely switch the interface mode of the Ethernet optical port on the PCIE network card. Therefore, the description mainly relates to the main processor and the Ethernet optical port, and not all the modules existing on the PCIE network card are fully described.

The Ethernet optical port is generally represented as an optical fiber interface, and the optical fiber interface is a physical interface for connecting an optical fiber cable. It should be noted that a common PCIE network card may only support an optical port protocol and cannot support a PCIE protocol. However, in some embodiments of the present application, the Ethernet optical port may not only support the optical port protocol but also support the PCIE protocol.

In some embodiments, the Ethernet optical port is connected to the main processor through a hardware link. The hardware link may be that the Ethernet optical port is connected to a pin of the main processor through an optical port high-speed data line and a PCIE high-speed data line. The Ethernet optical port is connected to an optical module. The optical port high-speed data line may be configured to transmit a differential signal transmitted by the optical module to the main processor through the Ethernet optical port, and the PCIE high-speed data line may be configured to transmit a differential signal transmitted by the main processor to the optical module through the Ethernet optical port. Data interaction between the main processor and the optical module may be realized through the design of the hardware link.

It should be noted that for the design of the hardware link, in actual situations, there may be a plurality of or multiple links, and a person skilled in the art may design according to actual situations, which is not limited by some embodiments of the present application.

The main processor may be an FPGA chip. In some embodiments of the present application, the FPGA chip is used as the main processor of the PCIE network card. The FPGA chip may support the optical port mode and the PCIE interface mode, and the FPGA chip may realize the free switching between the optical port mode and the PCIE interface mode in the Ethernet optical port. The FPGA chip may be used as a semi-custom circuit in the field of ASICs, which not only solves the deficiency of the custom circuits but also overcomes the shortcomings of the limited quantity of gate circuits of the original programmable device. It should be noted that for the selection of the main processor, a person skilled in the art may make a selection according to actual situations, which is not limited by some embodiments of the present application.

For the interface mode, in a common PCIE network card, there is only one interface mode, i.e., the optical port mode may only be used as a network extension and cannot be used as a storage interface extension. In some embodiments of the present application, there are two interface modes, i.e., the optical port mode and the PCIE interface mode. One mode is a default optical port mode in the Ethernet optical port of the PCIE network card, and the other mode is a compatible PCIE interface mode in the Ethernet optical port of the PCIE network card. That is, the Ethernet optical port may be compatible with the optical port mode and the PCIE interface mode so that the PCIE network card may be used as the network expansion and the storage expansion, the problem of the limited quantity of PCIE slots of the PC host is effectively solved and the cost of hardware is saved.

The storage expansion card may extend more storage hard disk interfaces for the PC host through the PCIE interface, such as PCIE to M.2 (hard disk interface specification) SSDs and PCIE to SATA. The PCIE storage expansion card mainly provides more local storage interfaces for the CPU and then connects more local hard disks.

In an implementation, the PCIE network card may include an Ethernet optical port and a main processor, i.e., an Ethernet optical port and an FPGA chip. The Ethernet optical port is connected to the FPGA chip through a hardware link. The Ethernet optical port is configured to support a plurality of interface modes, wherein the interface modes may include an optical port mode and a PCIE interface mode. The FPGA chip is used as the main processor of the PCIE network card, and the FPGA chip (main processor) may freely switch the interface mode of the Ethernet optical port through the hardware link. When the interface mode of the Ethernet optical port is switched to the PCIE interface mode, the PCIE network card may be connected to the PCIE slot of the host as the storage expansion card. Through the hardware link provided in some embodiments of the present application, the Ethernet optical port may support the PCIE interface mode, i.e., the Ethernet optical port may not only be compatible with the optical port mode but also be compatible with the PCIE interface mode. In addition, the interface mode of the Ethernet optical port may be switched through the FPGA chip (main processor).

When the interface mode of the Ethernet optical port is switched to the PCIE interface mode, the PCIE network card may be connected to the PCIE slot of the host as the storage expansion card so that the Ethernet optical port on the PCIE network card may be used as the network port expansion and the storage interface expansion. Based on this, the FPGA chip (main processor) may realize the free switching of the interface modes in different application scenarios, thereby resource waste caused by frequent replacement of the PCIE network card is avoided and the cost of hardware is saved.

Figure 2:
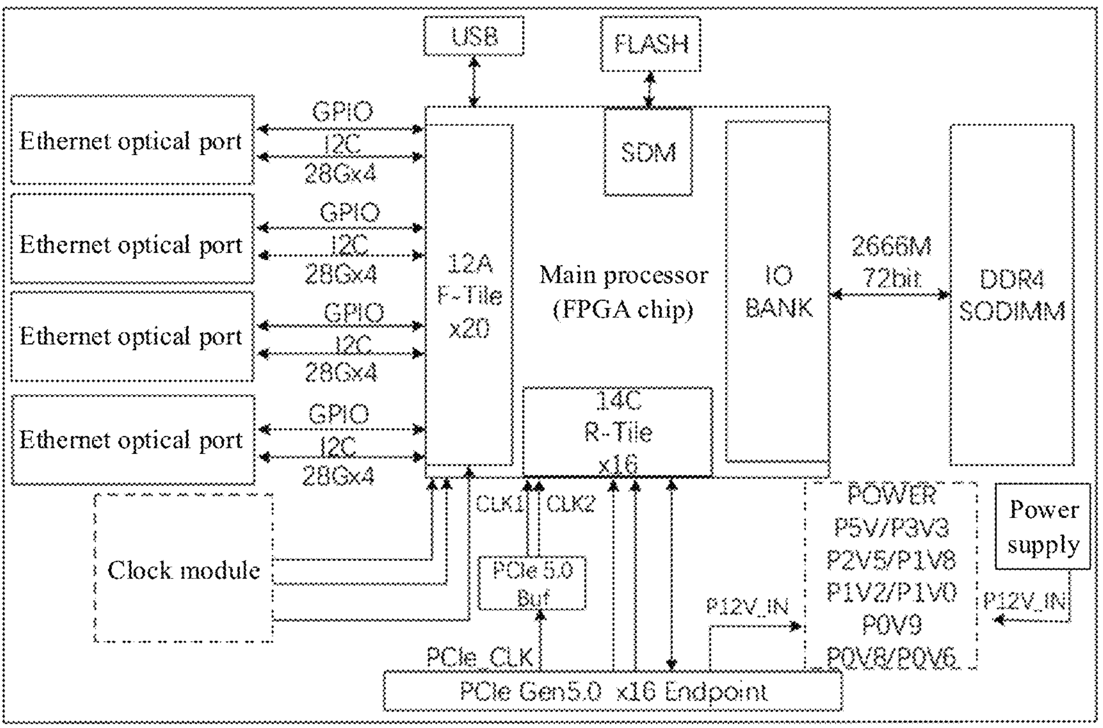
FIG. 2 is a second schematic structural diagram of a PCIE network card according to some embodiments of the present application.

Referring to FIG. 2, it is a second schematic structural diagram of a PCIE network card provided in some embodiments of the present application. In some embodiments of the present application, a PCIE network card based on a 4×100 G Ethernet optical port of an FPGA chip is adopted, wherein the 4×100 G is the transmission rate of the Ethernet optical port, and an agilex-I (model or series of FPGA chips) series FPGA chip of Intel is used as a main processor. It may be seen from the figure that the periphery of the FPGA chip is provided with a DDR for temporarily storing data, four 100 G QSFP28 Ethernet optical ports, and some basic devices. The QSFP28 may be expressed as an optical module with a transmission rate of 100 G and may be divided into a 4-channel optical module with a transmission rate of 25 G. Different from a common PCIE network card, the QSFP28 Ethernet optical port part used in some embodiments of the present application may support the Ethernet protocol and the PCIE4.0x4 protocol, thereby a physical basis is provided for realizing the compatibility design of the Ethernet optical port and the PCIE interface. The FPGA chip supports a plurality of hardware interfaces. The Ethernet optical port uses an F-tile (a type of hardware interface) hardware interface module of Intel and may support a 100 G NRT optical port mode, and may support a PCIE interface mode at the same time. Meanwhile, FPGA application software is updated by using the reconfigurable characteristic of the FPGA chip. The Ethernet optical port is designed to be compatible with the PCIE interface so that special cables or customized mini SSD modules may be inserted into the Ethernet optical port to realize the hard disk expansion function of NVMe x4. The PCIE network card may be directly used as a hard disk expansion card to provide a hard disk expansion function for a PC host, thereby the conversion between the PCIE network card and a PCIE storage card is realized.

The reconfigurable characteristic of the FPGA chip allows for the loading of different BITSTREAM files during the operation of the FPGA chip controlled by an upper computer. The FPGA chip reconfigures all or part of the internal resources according to different logic in the files to achieve the goal of dynamic switching of multiple functional tasks, thereby the flexibility of development using the FPGA chip is improved.

It should be noted that since the reconfigurable characteristic of the FPGA chip is an existing technical solution, in some embodiments of the present application, freely switching the interface mode of the Ethernet optical port only using this characteristic on the basis of realizing the Ethernet optical port compatible with the network extension and the storage extension may be understood as switching to the network extension or the storage extension. This is because how the reconfigurable characteristic of the FPGA chip switches the interface mode on the Ethernet optical port is a function at the software level and will not be described in detail herein by some embodiments of the present application.

In some embodiments of the present application, a PCIE network card is provided, which includes an Ethernet optical port and a main processor. The Ethernet optical port is connected to the main processor. The Ethernet optical port may be configured to support a plurality of interface modes, and the default mode is the optical port mode. Through the hardware link provided in some embodiments of the present application, the Ethernet optical port may also support the PCIE interface mode, i.e., the Ethernet optical port may not only be compatible with the optical port mode but also be compatible with the PCIE interface mode. In addition, the interface mode of the Ethernet optical port may be switched through the main processor. When the interface mode of the Ethernet optical port is switched to the PCIE interface mode, the PCIE network card may be connected to the PCIE slot of the host as the storage expansion card so that the Ethernet optical port on the PCIE network card may be used as a network port expansion and a storage interface expansion. Thus, the main processor may realize the free switching of the interface modes in different application scenarios, thereby resource waste caused by frequent replacement of the PCIE network card is avoided and the cost of hardware is saved.

In some embodiments, the optical module is connected to the host. The main processor includes a ModSeL signal, and an output pin corresponding to the ModSeL signal on the main processor is connected to an input pin corresponding to the ModSeL signal on the Ethernet optical port. The ModSeL signal is a control signal outputted by the host to the optical module.

Figure 3:
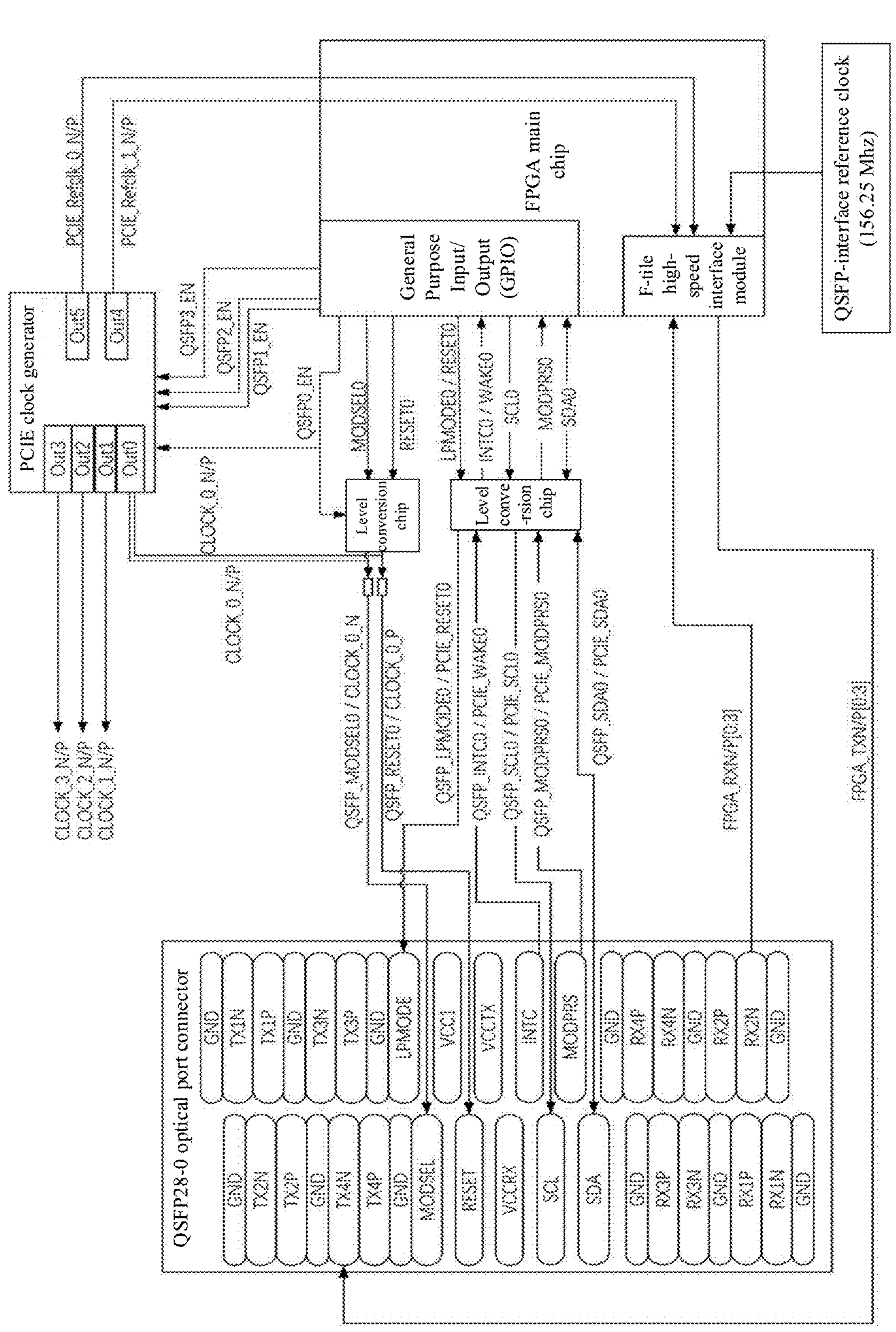
FIG. 3 is a schematic diagram of a hardware link of a PCIE network card according to some embodiments of the present application.

Referring to FIG. 3, it is a schematic diagram of a hardware link of a PCIE network card provided in some embodiments of the present application. In an implementation, an optical module is connected to a host. It may be seen from FIG. 3 that an FPGA chip is used as a main processor. The FPGA chip includes a ModSeL signal, and the output pin corresponding to the ModSeL signal on the FPGA chip is connected to the input pin corresponding to the ModSeL signal on the Ethernet optical port. Since the optical module is connected to the host, the ModSeL signal included in the FPGA chip may be transmitted to the optical module by using the Ethernet optical port as an intermediate medium.

The ModSeL signal is the control signal outputted by the host to the optical module. When a level control signal of the host is a low-level signal, the optical module may respond to an inter-integrated circuit (I2C) command to read state information of the optical module internally stored in the optical module. The state information of the optical module may have two module types, i.e., an optical module type and a non-optical module type. The optical module type may represent a module existing in the form of an optical module and adopting an Ethernet protocol (the above-mentioned optical port protocol), and the non-optical module type may represent a module existing in the form of an optical module and adopting a PCIE protocol. In an implementation, in the process of the optical module reading the state information of the optical module internally stored in the optical module in response to the I2C command, when the acquired module type is the optical module type, the interface mode of the Ethernet optical port defaults to the optical port mode, a QSFP0_EN signal (level signal of the Ethernet optical port) is a high-level signal, a channel of a clock module (out1 of a clock generator) does not output a clock signal, a level conversion chip is in an on state, and all low-speed signals will be defined as a QSFP28 interface mode, i.e., the optical port mode. When the module type is the non-optical module type, the reconfigurable characteristic of the FPGA chip may be used to switch the optical port mode to the PCIE interface mode. When a module type at an opposite end of the optical module read by the FPGA chip through the I2C is the non-optical module type, the FPGA needs to be partially reconfigured, and a part of the cores of the Ethernet optical port adopting the F-tile of the Intel are changed to the PCIE interface mode. When switching to the PCIE interface mode, all low-speed signals are defined as the PCIE interface mode. Meanwhile, the QSFP0_EN signal is a low-level signal, and the level conversion chip is in an off state and the output pin thereof is in a high resistance state. The out1 channel of the clock generator outputs a 100 MHz reference clock to provide a homologous reference clock for an external PCIE interface so that the QSFP28 interface (Ethernet optical port) becomes a PCIE external interface, and only a customized interface cable needs to be inserted to complete the NVMe hard disk of the external PCIE interface.

The low-speed signals may include a ModSeL signal, a Reset signal, an SCL signal, an SDA signal, an LPMode signal, a ModPrs signal, and an INTC signal.

In some embodiments, the optical module is connected to the host. The main processor includes a Reset signal, and an output pin corresponding to the Reset signal on the main processor is connected to an input pin corresponding to the Reset signal on the Ethernet optical port. The Reset signal is a reset signal sent by the host to the optical module.

In an implementation, the optical module is connected to the host. It may be seen from FIG. 3 that the FPGA chip includes a Reset signal, and the output pin corresponding to the Reset signal on the FPGA chip is connected to the input pin corresponding to the Reset signal on the Ethernet optical port. Since the optical module is connected to the host, the Reset signal included in the FPGA chip may be transmitted to the optical module by using the Ethernet optical port as an intermediate medium. The Reset signal is a reset signal sent by the host to the optical module.

In some embodiments, the I2C serial bus consists of two signal lines, wherein one is the serial data (SDA), and the other is the serial clock (SCL).

In some embodiments, the optical module is connected to the host. The main processor includes an SCL signal, and an output pin corresponding to the SCL signal on the main processor is connected to an input pin corresponding to the SCL signal on the Ethernet optical port. The SCL signal is used for reading an optical module state of the optical module to determine a module type of the optical module.

In an implementation, the optical module is connected to the host. It may be seen from FIG. 3 that the FPGA chip includes an SCL signal, and the output pin corresponding to the SCL signal on the FPGA chip is connected to the input pin corresponding to the SCL signal on the Ethernet optical port. Since the optical module is connected to the host, the SCL signal included in the FPGA chip may be transmitted to the optical module by using the Ethernet optical port as an intermediate medium. The SCL signal is used for reading the optical module state of the optical module to determine the module type of the optical module.

In some embodiments, the optical module is connected to the host. The main processor includes an SDA signal, and an output pin corresponding to the SDA signal on the main processor is connected to an input pin corresponding to the SDA signal on the Ethernet optical port. The SDA signal is used for reading an optical module state of the optical module to determine a module type of the optical module.

In an implementation, the optical module is connected to the host. It may be seen from FIG. 3 that the FPGA chip includes an SDA signal, and the output pin corresponding to the SDA signal on the FPGA chip is connected to the input pin corresponding to the SDA signal on the Ethernet optical port. Since the optical module is connected to the host, the SDA signal included in the FPGA chip may be transmitted to the optical module by using the Ethernet optical port as an intermediate medium. The SDA signal is used for reading the optical module state of the optical module to determine the module type of the optical module.

In some embodiments, the optical module is connected to the host. The main processor includes an LPMode signal, and an output pin corresponding to the LPMode signal on the main processor is connected to an input pin corresponding to the LPMode signal on the Ethernet optical port. The LPMode signal is used for controlling whether a working mode of the optical module enters a low power consumption mode.

In an implementation, the optical module is connected to the host. It may be seen from FIG. 3 that the FPGA chip includes an LPMode signal, and the output pin corresponding to the LPMode signal on the FPGA chip is connected to the input pin corresponding to the LPMode signal on the Ethernet optical port. Since the optical module is connected to the host, the LPMode signal included in the FPGA chip may be transmitted to the optical module by using the Ethernet optical port as an intermediate medium. The LPMode signal is used for controlling whether the working mode of the optical module enters the low power consumption mode.

In some embodiments, the optical module is connected to the host. The optical module is connected to the Ethernet optical port and sends a ModPrs signal to the Ethernet optical port. An input pin corresponding to the ModPrs signal on the main processor is connected to an output pin corresponding to the ModPrs signal on the Ethernet optical port. The ModPrs signal is used for reading whether the optical module is present.

In an implementation, the optical module is connected to the host, and the optical module is connected to the Ethernet optical port. It may be seen from FIG. 3 that the optical module sends the ModPrs signal to the Ethernet optical port, and the input pin corresponding to the ModPrs signal on the FPGA chip is connected to the output pin corresponding to the ModPrs signal on the Ethernet optical port. The ModPrs signal is used for reading whether the optical module is present so that the state information of the optical module may be determined to determine the module type of the optical module.

In some embodiments, the optical module is connected to the host. The optical module is connected to the Ethernet optical port and sends an INTC signal to the Ethernet optical port. An input pin corresponding to the INTC signal on the main processor is connected to an output pin corresponding to the INTC signal on the Ethernet optical port. The INTC signal is used for determining whether a signal outputted by the optical module to the host is interrupted, and sending interruption information to the host.

In an implementation, the optical module is connected to the host, and the optical module is the Ethernet optical port. It may be seen from FIG. 3 that the optical module sends the INTC signal to the Ethernet optical port, and the input pin corresponding to the INTC signal on the FPGA chip is connected to the output pin corresponding to the INTC signal on the Ethernet optical port. The INTC signal is used for determining whether the signal outputted by the optical module to the host is interrupted, and sending the interruption information to the host to indicate that the optical module has an alarm or a fault lamp.

In some embodiments of the present application, the low-speed signals may include the above-mentioned ModSeL signal, Reset signal, SCL signal, SDA signal, LPMode signal, ModPrs signal, and INTC signal. It is possible to implement the function of the Ethernet optical port as both the network extension and the storage extension by defining and functionally implementing the signals of the Ethernet optical port (QSFP28 optical port connector interface) and the PCIE interface (PCIE4.0 X4 interface).

In some embodiments, the optical module is provided with a memory, and the memory is configured to store module types for the optical module. The PCIE network card includes a level conversion chip, and the level conversion chip is configured to convert a high-level signal in the Ethernet optical port into a low-level signal compatible with the main processor. After the level conversion chip converts the high-level signal in the Ethernet optical port into the low-level signal compatible with the main processor, the main processor reads the module type stored in the optical module and selects an interface mode of the Ethernet optical port according to the module type of the optical module.

In some embodiments, the optical module is configured to perform signal conversion between an electrical signal and an optical signal. When the module type is the optical module type, the interface mode of the Ethernet optical port is the optical port mode, and when the module type is the non-optical module type, the main processor switches the optical port mode to the PCIE interface mode.

In an implementation, a 3.3 V signal on the Ethernet optical port (optical port connector) may be converted into a level compatible with the FPGA chip through the level conversion chip and then connected to an IO pin of the FPGA chip. The FPGA chip may read a module type at the opposite end of the optical module through the I2C control command to select whether to use the QSFP28 network interface mode (optical port mode) or the PCIE interface mode, thereby the low-speed signal is defined as a corresponding interface mode.

In some embodiments, the optical module transmits a first differential signal to the main processor through the optical port high-speed data line connected to the Ethernet optical port to realize data interaction between the main processor and the optical module. The main processor transmits a second differential signal to the Ethernet optical port through the PCIE high-speed data line to realize data interaction between the main processor and the optical module.

In an implementation, the optical module transmits the first differential signal to the FPGA chip through the optical port high-speed data line connected to the Ethernet optical port to realize data interaction between the FPGA chip and the optical module. The FPGA chip transmits the second differential signal to the Ethernet optical port through the PCIE high-speed data line to realize data interaction between the FPGA chip and the optical module.

It may be seen from FIG. 3 that the first differential signal corresponding to the optical port high-speed data line is FPGA_RXN/P [0:3], and the second differential signal corresponding to the PCIE high-speed data line is FPGA_TXN/P [0:3]. The two signals of FPGA_RXN/P [0:3] and FPGA_TXN/P [0:3] are received and sent, the Ethernet optical port is connected to the pin of the FPGA chip through the optical port high-speed data line and the PCIE high-speed data line, and the Ethernet optical port is connected to the optical module so that the compatibility of the hardware link may be achieved, and thus the interface mode of the Ethernet optical port may be freely switched by using the FPGA chip.

In some embodiments, the PCIE network card includes a clock module, wherein the clock module is configured to output a reference clock signal.

When the interface mode of the Ethernet optical port is an optical port mode, a level control signal outputted by the main processor is a high-level signal, and the clock module prohibits outputting the reference clock signal.

When the interface mode of the Ethernet optical port is the PCIE interface mode, the level control signal outputted by the main processor is a low-level signal. The clock module outputs the reference clock signal. The Ethernet optical port is used as a PCIE external interface according to the low-level signal and the reference clock signal, and the PCIE external interface is configured to externally connect to an SSD.

In some embodiments of the present application, the PCIE network card includes a clock module, wherein the clock module is configured to output the reference clock signal. When the interface mode of the Ethernet optical port is the optical port mode, the level control signal outputted by the main processor is the high-level signal, and the clock module prohibits outputting the reference clock signal. When the interface mode of the Ethernet optical port is the PCIE interface mode, the level control signal outputted by the main processor is the low-level signal. The clock module outputs the reference clock signal. The Ethernet optical port is used as the PCIE external interface according to the low-level signal and the reference clock signal, and the PCIE external interface is configured to externally connect to the SSD.

In some embodiments, the optical module is powered by a three-way power supply, and when the PCIE external interface is externally connected to the SSD, the SSD reuses the power supply for powering the SSD.

For the design of the power supply, the power supply of the PCIE network card generally adopts a gold finger power supply mode and an external 12 V power supply mode. Since the design of the power supply belongs to the related art, it will not be described in detail herein by some embodiments of the present application.

In an implementation, the description of the power supply of the Ethernet optical port and the power supply of the external NVMe hard disk is mainly designed. It may be seen from FIG. 2 that the power supply provided by the host for the optical module is divided into three 3.3 V power supplies, i.e., VCCRX, VCCTX, and VCC1, with a power supply range of 3.3 V±5% and a power of 1.5-10 W. When the PCIE external interface is externally connected to the SSD, the power supply of the SSD may reuse the three power supplies as the power supply of the SSD, and the power supply requirement of the SSD is also 3.3 V±5%. The power consumption of the SSD is about 2-10 W according to different capacities and rates. Therefore, the power supply interface is compatible, providing a power supply-compatible basis for the Ethernet optical port to be compatible with a plurality of interface modes.

In some embodiments of the present application, a PCIE network card is provided, which includes an Ethernet optical port and a main processor. The Ethernet optical port is connected to the main processor. The Ethernet optical port may be configured to support the plurality of interface modes, and the default mode is the optical port mode. Through the design of the hardware link and low-speed signal, the Ethernet optical port may also support the PCIE interface mode, i.e., the Ethernet optical port may not only be compatible with the optical port mode but also be compatible with the PCIE interface mode. In addition, the interface mode of the Ethernet optical port may be switched through the main processor. When the interface mode of the Ethernet optical port is switched to the PCIE interface mode, the PCIE network card may be connected to the PCIE slot of the host as the storage expansion card so that the Ethernet optical port on the PCIE network card may be used as a network port expansion and a storage interface expansion. Thus, the main processor may realize the free switching of the interface modes in different application scenarios, thereby resource waste caused by frequent replacement of the PCIE network card is avoided and the cost of hardware is saved.

A method for switching an interface mode of a PCIE network card is further provided by some embodiments of the present application, which is applied to the PCIE network card. The PCIE network card includes an Ethernet optical port and a main processor, and the Ethernet optical port is connected to the main processor. The Ethernet optical port is configured to support a plurality of interface modes, and the interface modes include a PCIE interface mode. The steps are as follows:

switching the interface mode of the Ethernet optical port through the main processor, wherein when the interface mode of the Ethernet optical port is switched to the PCIE interface mode, the PCIE network card is connected to a PCIE slot of a host as a storage expansion card.

For the PCIE network card, it is a network adapter with a PCIE interface, which is used as an expansion card interface in a motherboard-level connection. A PCIE-based expansion card design is usually installed in a PCIE-based slot in motherboards of devices such as a host, a server, and a network switch. Most motherboards have a PCIE slot, which is usually only configured to install the PCIE network card in the corresponding PCIE slot. In some embodiments of the present application, basic modules on the PCIE network card may include a main processor, a clock module (circuit), a power supply circuit, an onboard storage circuit, and an interface circuit, and the interface circuit may include a power supply interface, a memory interface, a PCIE interface, an Ethernet optical port, and a USB debugging interface.

It should be noted that in some embodiments of the present application, the design primarily focuses on the compatibility of the Ethernet optical port on the PCIE network card, and the main processor is used to freely switch the interface mode of the Ethernet optical port on the PCIE network card. Therefore, the description mainly relates to the main processor and the Ethernet optical port, and not all the modules existing on the PCIE network card are fully described.

The Ethernet optical port is generally represented as an optical fiber interface, and the optical fiber interface is a physical interface for connecting an optical fiber cable. It should be noted that a common PCIE network card may only support an optical port protocol and cannot support a PCIE protocol. However, in some embodiments of the present application, the Ethernet optical port may not only support the optical port protocol but also support the PCIE protocol.

In some embodiments, the Ethernet optical port is connected to the main processor through a hardware link. The hardware link may be that the Ethernet optical port is connected to a pin of the main processor through an optical port high-speed data line and a PCIE high-speed data line. The Ethernet optical port is connected to an optical module. The optical port high-speed data line may be configured to transmit a differential signal transmitted by the optical module to the main processor through the Ethernet optical port, and the PCIE high-speed data line may be configured to transmit a differential signal transmitted by the main processor to the optical module through the Ethernet optical port. Data interaction between the main processor and the optical module may be realized through the design of the hardware link.

It should be noted that for the design of the hardware link, in actual situations, there may be a plurality of or multiple links, and a person skilled in the art may design according to actual situations, which is not limited by some embodiments of the present application.

The main processor may be an FPGA chip. In some embodiments of the present application, the FPGA chip is used as the main processor of the PCIE network card. The FPGA chip may support the optical port mode and the PCIE interface mode, and the FPGA chip may realize the free switching between the optical port mode and the PCIE interface mode in the Ethernet optical port. The FPGA chip may be used as a semi-custom circuit in the field of ASICs, which not only solves the deficiency of the custom circuits but also overcomes the shortcomings of the limited quantity of gate circuits of the original programmable device. It should be noted that for the selection of the main processor, a person skilled in the art may make a selection according to actual situations, which is not limited by some embodiments of the present application.

For the interface mode, in a common PCIE network card, there is only one interface mode, i.e., the optical port mode may only be used as a network extension and cannot be used as a storage interface extension. In some embodiments of the present application, there are two interface modes, i.e., the optical port mode and the PCIE interface mode. One mode is a default optical port mode in the Ethernet optical port of the PCIE network card, and the other mode is a compatible PCIE interface mode in the Ethernet optical port of the PCIE network card. That is, the Ethernet optical port may be compatible with the optical port mode and the PCIE interface mode so that the PCIE network card may be used as the network expansion and the storage expansion, the problem of the limited quantity of PCIE slots of the PC host is effectively solved and the cost of hardware is saved.

The storage expansion card may extend more storage hard disk interfaces for the PC host through the PCIE interface, such as PCIE to M.2 (hard disk interface specification) SSDs and PCIE to SATA. The PCIE storage expansion card mainly provides more local storage interfaces for the CPU and then connects more local hard disks.

In an implementation, the PCIE network card may include an Ethernet optical port and a main processor, i.e., an Ethernet optical port and an FPGA chip. The Ethernet optical port is connected to the FPGA chip through a hardware link. The Ethernet optical port is configured to support a plurality of interface modes, wherein the interface modes may include an optical port mode and a PCIE interface mode. The FPGA chip is used as the main processor of the PCIE network card, and the FPGA chip may freely switch the interface mode of the Ethernet optical port through the hardware link. When the interface mode of the Ethernet optical port is switched to the PCIE interface mode, the PCIE network card may be connected to the PCIE slot of the host as the storage expansion card. Through the hardware link provided in some embodiments of the present application, the Ethernet optical port may support the PCIE interface mode, i.e., the Ethernet optical port may not only be compatible with the optical port mode but also be compatible with the PCIE interface mode. In addition, the interface mode of the Ethernet optical port may be switched through the FPGA chip. When the interface mode of the Ethernet optical port is switched to the PCIE interface mode, the PCIE network card may be connected to the PCIE slot of the host as the storage expansion card so that the Ethernet optical port on the PCIE network card may be used as the network port expansion and the storage interface expansion. Based on this, the FPGA chip may realize the free switching of the interface modes in different application scenarios, thereby resource waste caused by frequent replacement of the PCIE network card is avoided and the cost of hardware is saved.

In some embodiments, the method further includes:

in response to the interface mode of the Ethernet optical port being an optical port mode, a level control signal outputted by the main processor being a high-level signal, and prohibiting, by a clock module, outputting a reference clock signal, wherein a level conversion chip converts the high-level signal in the Ethernet optical port into a low-level signal compatible with the main processor; and in response to a module type of the optical module read by the main processor being a non-optical module type, switching the optical port mode to the PCIE interface mode, wherein the level control signal outputted by the main processor is a low-level signal, and the clock module outputs the reference clock signal; the reference clock signal is used for using the Ethernet optical port as a PCIE external interface, and the PCIE external interface is configured to externally connect to an SSD.

In an implementation, when the interface mode of the Ethernet optical port is the optical port mode, the level control signal outputted by the main processor is the high-level signal, and the clock module prohibits outputting the reference clock signal, wherein the level conversion chip converts the high-level signal in the Ethernet optical port into the low-level signal compatible with the main processor. When the module type of the optical module read by the main processor is the non-optical module type, the optical port mode is switched to the PCIE interface mode, wherein the level control signal outputted by the main processor is the low-level signal, and the clock module outputs the reference clock signal. The reference clock signal is used for using the Ethernet optical port as the PCIE external interface, and the PCIE external interface is configured to externally connect to the SSD.

In some embodiments of the present application, a PCIE network card is provided, which includes an Ethernet optical port and a main processor. The Ethernet optical port is connected to the main processor. The Ethernet optical port may be configured to support a plurality of interface modes, and the default mode is the optical port mode. Through the hardware link provided in some embodiments of the present application, the Ethernet optical port may also support the PCIE interface mode, i.e., the Ethernet optical port may not only be compatible with the optical port mode but also be compatible with the PCIE interface mode. In addition, the interface mode of the Ethernet optical port may be switched through the main processor. When the interface mode of the Ethernet optical port is switched to the PCIE interface mode, the PCIE network card may be connected to the PCIE slot of the host as the storage expansion card so that the Ethernet optical port on the PCIE network card may be used as a network port expansion and a storage interface expansion. Thus, the main processor may realize the free switching of the interface modes in different application scenarios, thereby resource waste caused by frequent replacement of the PCIE network card is avoided and the cost of hardware is saved.

It should be noted that for simplicity of explanation, method embodiments are presented as a series of combinations of actions, but a person skilled in the art will appreciate that some embodiments of the present application are not limited by the order of actions described, as some steps may be performed in other orders or simultaneously according to some embodiments of the present application. In addition, the actions involved are not necessarily necessary for some embodiments of the present application.

In addition, an electronic device is further provided by some embodiments of the present application, which includes: a processor, a memory, and a computer program stored in the memory and executable on the processor. The computer program, when executed by the processor, implements various processes of the above-mentioned embodiment of the method for switching an interface mode of a PCIE network card and may achieve the same technical effect. In order to avoid repetition, the description thereof will not be repeated.

Figures 4, 5:
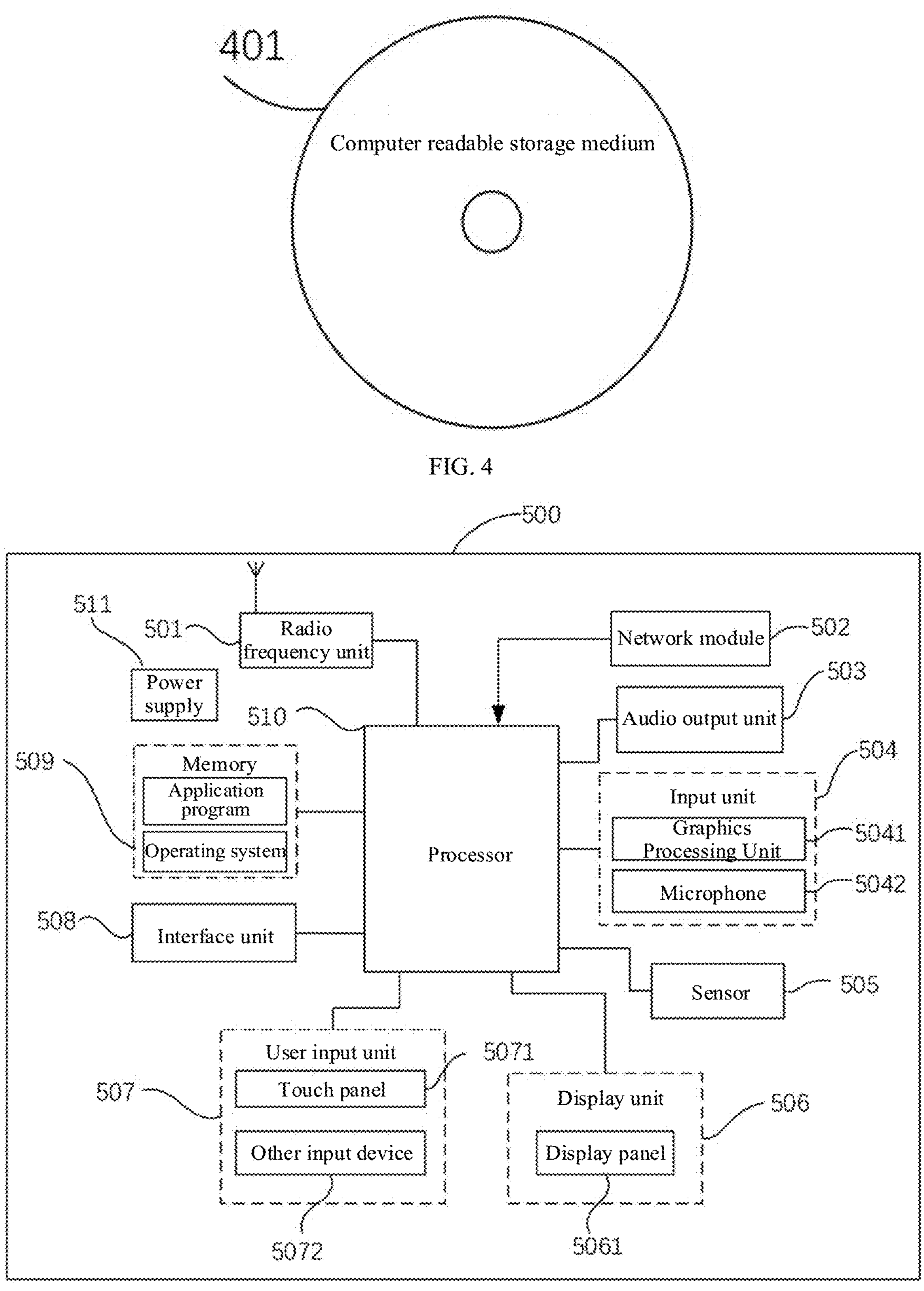
FIG. 4 is a schematic structural diagram of a non-transitory readable storage medium provided in some embodiments of the present application.
FIG. 5 is a schematic structural diagram of hardware of an electronic device implementing various embodiments of the present application.

FIG. 4 is a schematic structural diagram of a non-transitory readable storage medium provided in some embodiments of the present application.

A non-transitory readable storage medium 401 storing a computer program is also provided by some embodiments of the present application, the computer program, when executed by a processor, implements various processes of the above-mentioned embodiment of the method for switching an interface mode of a PCIE network card and may achieve the same technical effect. In order to avoid repetition, the description thereof will not be repeated. The non-transitory readable storage medium 401 may be a read-only memory (ROM), a random access memory (RAM), a magnetic disk, or an optical disk.

FIG. 5 is a schematic structural diagram of hardware of an electronic device implementing various embodiments of the present application.

The electronic device 500 includes, but is not limited to: a radio frequency unit 501, a network module 502, an audio output unit 503, an input unit 504, a sensor 505, a display unit 506, a user input unit 507, an interface unit 508, a memory 509, a processor 510, and a power supply 511. It will be appreciated by a person skilled in the art that the structure of the electronic device shown in FIG. 5 does not constitute a limitation on the electronic device. The electronic device may include more or fewer components than those illustrated, or a combination of some components, or have a different arrangement of components. In some embodiments of the present application, electronic devices include, but are not limited to, mobile phones, tablet computers, notebook computers, palmtops, vehicle terminals, wearable devices, and pedometers.

It should be understood that in some embodiments of the present application, the radio frequency unit 501 may be configured to receive and send signals during information receiving and sending or calling. The radio frequency unit 501 is configured to after receiving downlink data from a base station, send the downlink data to the processor 510 for processing, and transmit uplink data to the base station. Generally, the radio frequency unit 501 includes, but is not limited to, an antenna, at least one amplifier, a transceiver, a coupler, a low-noise amplifier, and a duplexer. In addition, the radio frequency unit 501 may also be communicated with networks and other devices through a wireless communication system.

The electronic device provides the user with wireless broadband Internet access through the network module 502, such as assisting the user in receiving and sending e-mail, browsing web pages, and accessing streaming media.

The audio output unit 503 may convert audio data received by the radio frequency unit 501 or the network module 502 or stored in the memory 509 into an audio signal and output as sound. Moreover, the audio output unit 503 may also provide audio output (such as call signal reception sound and message reception sound) related to a particular function performed by the electronic device 500. The audio output unit 503 includes a speaker, a buzzer, a receiver, etc.

The input unit 504 is configured to receive an audio or video signal. The input unit 504 may include a graphics processing unit (GPU) 5041 and a microphone 5042. The GPU 5041 processes image data of a static picture or video obtained by an image capturing apparatus (such as a camera) in a video capturing mode or an image capturing mode. A processed image frame may be displayed on the display unit 506. The image frame processed by GPU 5041 may be stored in memory 509 (or other storage medium) or sent via the radio frequency unit 501 or the network module 502. The microphone 5042 may receive sound and process such sound into audio data. The processed audio data may be converted into a format that may be sent to a mobile communication base station via the radio frequency unit 501 in a telephone call mode for outputting.

The electronic device 500 also includes at least one sensor 505, such as a light sensor, a motion sensor, and other sensors. The light sensor includes an ambient light sensor and a proximity sensor. The ambient light sensor may adjust the brightness of a display panel 5061 according to the brightness of ambient light, and the proximity sensor may turn off the display panel 5061 and/or backlight when the electronic device 500 moves to the ear. As a kind of motion sensor, an accelerometer sensor may detect the size of acceleration in various directions (generally three axes), may detect the size and direction of gravity at rest, and may be configured to identify postures of an electronic device (such as horizontal and vertical screen switching, relevant games, and magnetometer posture calibration), vibration recognition related functions (such as pedometer and knocking), etc. The sensor 505 may also include a fingerprint sensor, a pressure sensor, an iris sensor, a molecular sensor, a gyroscope, a barometer, a hygrometer, a thermometer, an infrared sensor, etc., which will not be described in detail herein.

The display unit 506 is configured to display information inputted by the user or information provided to the user. The display unit 506 may include the display panel 5061, which may be configured in the form of a liquid crystal display (LCD), an organic light-emitting diode (OLED), etc.

The user input unit 507 may be configured to receive inputted number or character information and generate key signal input related to user settings and function control of the electronic device. The user input unit 507 includes a touch panel 5071 and other input devices 5072. The touch panel 5071, also referred to as a touch screen, may acquire user touch operations (such as user operations on or near the touch panel 5071 using any suitable object or accessory, such as a finger and a stylus) on or near the touch panel. The touch panel 5071 may include two parts, i.e., a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into a touch point coordinate, sends the touch point coordinate to the processor 510, and receives and executes a command sent by the processor 510. In addition, the touch panel 5071 may be implemented using various types such as resistive, capacitive, infrared, and surface acoustic waves. In addition to the touch panel 5071, the user input unit 507 may also include other input devices 5072. Other input devices 5072 may include, but are not limited to, a physical keyboard, a function key (such as a volume control key and a switch key), a trackball, a mouse, a joystick, etc., which will not be described in detail herein.

Further, the touch panel 5071 may be covered on the display panel 5061. When the touch panel 5071 detects a touch operation on or near the touch panel, the touch operation is transmitted to the processor 510 to determine the type of the touch event. Then, the processor 510 provides a corresponding visual output on the display panel 5061 according to the type of the touch event. Although in FIG. 5, the touch panel 5071 and the display panel 5061 are used as two separate components to realize the input and output functions of the electronic device, in some embodiments, the touch panel 5071 and the display panel 5061 may be integrated to realize the input and output functions of the electronic device, which is not limited herein.

The interface unit 508 is an interface where an external apparatus is connected to the electronic device 500. For example, the external apparatus may include a wired or wireless headset port, an external power supply (or battery charger) port, a wired or wireless data port, a memory card port, a port configured to connect to an apparatus having an identification module, an audio I/O port, a video I/O port, an earphone port, etc. The interface unit 508 may be configured to receive input (such as data information and power) from the external apparatus and transmit the received input to one or more elements within the electronic device 500 or may be configured to transmit data between the electronic device 500 and the external apparatus.

The memory 509 may be configured to store software programs and various data. The memory 509 may mainly include a program storage area and a data storage area. The program storage area may store an operating system, an application program required by at least one function (such as a sound playing function and an image playing function), etc. The data storage area may store data (such as audio data and a phone book) created according to the use of the mobile phone, etc. In addition, the memory 509 may include a high-speed RAM and a non-transitory memory, such as at least one magnetic disk storage device, a flash memory device, or other volatile solid-state storage devices.

The processor 510 is a control center of the electronic device, connects various parts of the entire electronic device by using various interfaces and lines, and performs various functions and process data of the electronic device by running or executing software programs and/or modules stored in the memory 509 and invoking data stored in the memory 509, thus the electronic device is monitored as a whole. The processor 510 may include one or more processing units. The processor 510 may integrate an application processor and a modem processor. The application processor mainly handles operating systems, user interfaces, application programs, etc., and the modem processor mainly handles wireless communications. It will be appreciated that the above-mentioned modem processor may not be integrated into the processor 510.

The electronic device 500 may also include a power supply 511 (such as a battery) to power the various components. The power supply 511 may be logically connected to the processor 510 through a power supply management system so that functions such as managing charging, discharging, and power consumption are realized through the power supply management system.

In addition, the electronic device 500 includes some functional modules, which are not shown and will not be described in detail herein.

It should be noted that, as used herein, the terms "include", "contain", or any other variation thereof are intended to cover a non-exclusive inclusion so that a process, method, article, or apparatus that includes a list of elements does not include only those elements but may include other elements not expressly listed or inherent to such process, method, article, or apparatus. An element limited by the phrase "include a . . . " does not, without more constraints, preclude the existence of additional identical elements in the process, method, article, or apparatus that includes the element.

Through the description of the above implementations, it will be clear to a person skilled in the art that the method of the above-mentioned embodiments may be implemented by software and a necessary general hardware platform, and of course by hardware, but in many cases the former is the implementation. Based on such an understanding, the technical solution of the present application essentially or in part contributing to the related art may be embodied in the form of a software product. A computer software product is stored in a storage medium (such as the ROM/RAM, magnetic disk, and optical disk) including several instructions for causing a terminal (which may be a mobile phone, a computer, a server, an air conditioner, or a network device, etc.) to perform the method according to various embodiments of the present application.

The embodiments of the present application are described above with reference to the drawings, but the present application is not limited to the above-mentioned implementations. The above-mentioned implementations are merely illustrative and not restrictive. A person skilled in the art, inspired by the present application and without departing from the purpose of the present application and the scope of the claims, may also make many forms, all of which fall within the scope of the present application.

A person skilled in the art may recognize that the units and algorithmic steps of the examples described in some embodiments of the present application may be implemented in electronic hardware or in a combination of computer software and electronic hardware. Whether these functions are implemented in hardware or software depends on the application and design constraints of the technical solutions. A person skilled in the art may use different methods to achieve the described function for each particular application, but this implementation shall not be considered outside the scope of the present application.

It will be clear to a person skilled in the art that, for convenience and brevity of description, the working processes of the systems, apparatuses, and units described above may be described with reference to corresponding processes in the foregoing method embodiments and will not be described in detail herein.

In the embodiments provided by the present application, it should be understood that the disclosed apparatus and method may be implemented in other ways. For example, the apparatus embodiments described above are merely illustrative. For example, the partitioning of units is merely a logical function partitioning, and actual implementations may have additional partitioning, such as a plurality of units or assemblies may be combined or integrated into another system, or some features may be omitted or not performed. In addition, the couplings, direct couplings, or communication connections shown or discussed with respect to each other may be indirect couplings or communication connections through some interfaces, apparatuses, or units, and may be electrical, mechanical, or otherwise.

The units illustrated as separate components may or may not be physically separated, and the components shown as units may or may not be physical units, i.e., may be located in one place, or may also be distributed over a plurality of network units. Some or all of the units may be selected to achieve the object of the solutions of the embodiments according to actual needs.

In addition, the functional units in various embodiments of the present application may be integrated in one processing unit, or each unit may physically exist separately, or two or more units may be integrated in one single unit.

Functions, if implemented in software functional units and sold or used as stand-alone products, may be stored in a computer-readable storage medium. Based on such an understanding, the technical solution of the present application essentially or in part contributing to the related art may be embodied in the form of a software product. The computer software product is stored in a storage medium including several instructions for causing a computer device (which may be a personal computer, a server, or a network device, etc.) to perform all or part of the steps of the method according to various embodiments of the present application. The foregoing storage medium includes: a USB flash drive, a mobile hard disk drive (HDD), a read-only memory (ROM), a random access memory (RAM), a magnetic disk, an optical disk, and various media that may store a program code.

The above are only implementations of the present application, and the scope of the present application is not limited thereto. Any changes and substitutions which may be readily thought of by a person skilled in the art within the technical scope disclosed in the present application fall within the scope of the present application. Therefore, the scope of the present application should be based on the scope limited by the claims.

The invention claimed is:

1. A peripheral component interconnect express (PCIE) network card, comprising an Ethernet optical port and a main processor, the Ethernet optical port being connected to the main processor;

wherein the Ethernet optical port is configured to support a plurality of interface modes, and the interface modes comprise a PCIE interface mode;

the main processor is configured to switch an interface mode of the Ethernet optical port; in response to the interface mode of the Ethernet optical port being switched to the PCIE interface mode, the PCIE network card is connected to a PCIE slot of a host as a storage expansion card;

wherein the PCIE network card comprises a clock module, the clock module is configured to output a reference clock signal;

in response to the interface mode of the Ethernet optical port being an optical port mode, a level control signal outputted by the main processor is a high-level signal, and the clock module prohibits outputting the reference clock signal; and in response to the interface mode of the Ethernet optical port being the PCIE interface mode, the level control signal outputted by the main processor is a low-level signal, wherein the clock module outputs the reference clock signal; the Ethernet optical port is used as a PCIE external interface according to the low-level signal and the reference clock signal, and the PCIE external interface is configured to externally connect to a solid state drive.

2. The PCIE network card according to claim 1, wherein the Ethernet optical port is connected to the main processor through a hardware link.

3. The PCIE network card according to claim 2, wherein the hardware link is that the Ethernet optical port is connected to a pin of the main processor through an optical port high-speed data line and a PCIE high-speed data line; and the Ethernet optical port is connected to an optical module.

4. The PCIE network card according to claim 3, wherein the optical module transmits a first differential signal to the main processor through the optical port high-speed data line connected to the Ethernet optical port to realize data interaction between the main processor and the optical module; and the main processor transmits a second differential signal to the Ethernet optical port through the PCIE high-speed data line to realize data interaction between the main processor and the optical module.

5. The PCIE network card according to claim 3, wherein the optical module is provided with a memory, and the memory is configured to store a module type for the optical module; the PCIE network card comprises a level conversion chip, and the level conversion chip is configured to convert a high-level signal in the Ethernet optical port into a low-level signal compatible with the main processor.

6. The PCIE network card according to claim 5, wherein after the level conversion chip converts the high-level signal in the Ethernet optical port into the low-level signal compatible with the main processor, the main processor reads the module type stored in the optical module and selects the interface mode of the Ethernet optical port according to the module type of the optical module.

7. The PCIE network card according to claim 6, wherein the optical module is configured to perform signal conversion between an electrical signal and an optical signal; and the module type comprises an optical module type and a non-optical module type;

in response to the module type being the optical module type, the interface mode of the Ethernet optical port is the optical port mode; and in response to the module type being the non-optical module type, the main processor switches the optical port mode to the PCIE interface mode.

8. The PCIE network card according to claim 1, wherein an optical module is powered by a three-way power supply, and in response to the PCIE external interface being externally connected to the solid state drive, the solid state drive reuses the power supply for powering the solid state drive.

9. The PCIE network card according to claim 1, wherein an optical module is connected to the host; the main processor comprises a ModSeL signal, and an output pin corresponding to the ModSeL signal on the main processor is connected to an input pin corresponding to the ModSeL signal on the Ethernet optical port, wherein the ModSeL signal is a control signal outputted by the host to the optical module.

10. The PCIE network card according to claim 1, wherein an optical module is connected to the host; the main processor comprises a Reset signal, and an output pin corresponding to the Reset signal on the main processor is connected to an input pin corresponding to the Reset signal on the Ethernet optical port, wherein the Reset signal is a reset signal sent by the host to the optical module.

11. The PCIE network card according to claim 1, wherein an optical module is connected to the host; the main processor comprises an SCL signal, and an output pin corresponding to the SCL signal on the main processor is connected to an input pin corresponding to the SCL signal on the Ethernet optical port, wherein the SCL signal is used for reading an optical module state of the optical module to determine a module type of the optical module.

12. The PCIE network card according to claim 1, wherein an optical module is connected to the host; the main processor comprises an SDA signal, and an output pin corresponding to the SDA signal on the main processor is connected to an input pin corresponding to the SDA signal on the Ethernet optical port, wherein the SDA signal is used for reading an optical module state of the optical module to determine a module type of the optical module.

13. The PCIE network card according to claim 1, wherein an optical module is connected to the host; the main processor comprises an LPMode signal, and an output pin corresponding to the LPMode signal on the main processor is connected to an input pin corresponding to the LPMode signal on the Ethernet optical port, wherein the LPMode signal is used for controlling whether a working mode of the optical module enters a low power consumption mode.

14. The PCIE network card according to claim 1, wherein an optical module is connected to the host; the optical module is connected to the Ethernet optical port, and the optical module sends a ModPrs signal to the Ethernet optical port; an input pin corresponding to the ModPrs signal on the main processor is connected to an output pin corresponding to the ModPrs signal on the Ethernet optical port, wherein the ModPrs signal is used for reading whether the optical module is present.

15. The PCIE network card according to claim 1, wherein an optical module is connected to the host; the optical module is connected to the Ethernet optical port, and the optical module sends an INTC signal to the Ethernet optical port; an input pin corresponding to the INTC signal on the main processor is connected to an output pin corresponding to the INTC signal on the Ethernet optical port, wherein the INTC signal is used for determining whether a signal outputted by the optical module to the host is interrupted, and sending interruption information to the host.

16. A method for switching an interface mode, applied to a PCIE network card, wherein the PCIE network card comprises an Ethernet optical port and a main processor, and the Ethernet optical port is connected to the main processor; the Ethernet optical port is configured to support a plurality of interface modes, and the interface modes comprise a PCIE interface mode; the method comprises:

switching the interface mode of the Ethernet optical port through the main processor, wherein in response to the interface mode of the Ethernet optical port being switched to the PCIE interface mode, the PCIE network card is connected to a PCIE slot of a host as a storage expansion card;

wherein the method further comprises:

in response to the interface mode of the Ethernet optical port being an optical port mode, a level control signal outputted by the main processor being a high-level signal, and prohibiting, by a clock module, outputting a reference clock signal, wherein a level conversion chip converts the high-level signal in the Ethernet optical port into a low-level signal compatible with the main processor; and in response to a module type of an optical module read by the main processor being a non-optical module type, switching the optical port mode to the PCIE interface mode, wherein the level control signal outputted by the main processor is a low-level signal, and the clock module outputs the reference clock signal; the reference clock signal is used for using the Ethernet optical port as a PCIE external interface, and the PCIE external interface is configured to externally connect to a solid state drive.

17. An electronic device, comprising a processor, a communication interface, a memory and a communication bus, wherein the processor, the communication interface and the memory are communicated with each other through the communication bus;

the memory is configured to store a computer program; and the processor is configured to, in response to executing the program stored on the memory, implement a method for switching an interface mode, applied to a PCIE network card, wherein the PCIE network card comprises an Ethernet optical port and a main processor, and the Ethernet optical port is connected to the main processor; the Ethernet optical port is configured to support a plurality of interface modes, and the interface modes comprise a PCIE interface mode; the method comprises:

switching the interface mode of the Ethernet optical port through the main processor, wherein in response to the interface mode of the Ethernet optical port being switched to the PCIE interface mode, the PCIE network card is connected to a PCIE slot of a host as a storage expansion card;

wherein the method further comprises:

in response to the interface mode of the Ethernet optical port being an optical port mode, a level control signal outputted by the main processor being a high-level signal, and prohibiting, by a clock module, outputting a reference clock signal, wherein a level conversion chip converts the high-level signal in the Ethernet optical port into a low-level signal compatible with the main processor; and in response to a module type of an optical module read by the main processor being a non-optical module type, switching the optical port mode to the PCIE interface mode, wherein the level control signal outputted by the main processor is a low-level signal, and the clock module outputs the reference clock signal; the reference clock signal is used for using the Ethernet optical port as a PCIE external interface, and the PCIE external interface is configured to externally connect to a solid state drive.

* * * * *